United States Patent [19]
Enders

[11] 4,222,811
[45] Sep. 16, 1980

[54] SERVICER FOR A TIRE BUILDING DRUM

[75] Inventor: George E. Enders, Salem, Ohio

[73] Assignee: NRM Corporation, Akron, Ohio

[21] Appl. No.: 886,744

[22] Filed: Mar. 15, 1978

[51] Int. Cl.² ............................................. B29H 17/20
[52] U.S. Cl. .................................. 156/406; 156/405 R
[58] Field of Search ............... 156/394, 396, 405, 406; 242/67.3 R; 226/7, 49–51, 97, 120, 143, 196, 198, 199

[56] References Cited

U.S. PATENT DOCUMENTS

| | | | |
|---|---|---|---|
| 2,658,691 | 11/1953 | Mallory | 242/64 |
| 2,755,028 | 7/1956 | Noall | 242/67.3 R |
| 2,820,908 | 1/1958 | Linderman | 226/198 |
| 2,833,027 | 5/1958 | Foster | 185/37 |
| 2,833,534 | 5/1958 | Foster | 185/37 |
| 3,162,562 | 12/1964 | Wenger et al. | 156/406 |
| 3,216,879 | 11/1965 | Mallory et al. | 156/406 |
| 3,230,132 | 1/1966 | Mallory et al. | 156/406 |
| 3,278,360 | 10/1966 | Cantarutti | 156/406 |
| 3,556,901 | 1/1971 | Tearne | 156/406 |
| 3,600,252 | 8/1971 | Henley et al. | 156/406 |
| 3,795,563 | 3/1974 | Enders et al. | 156/406 |
| 3,898,116 | 8/1975 | Katagiri et al. | 156/406 |
| 3,949,920 | 4/1976 | Habert et al. | 226/198 |
| 3,974,953 | 8/1976 | Klose | 226/198 |
| 4,052,245 | 10/1977 | Kuts | 156/405 |
| 4,105,487 | 8/1978 | Suzuki | 156/405 |
| 4,105,488 | 8/1978 | Hayes et al. | 156/425 |
| 4,120,717 | 10/1978 | Rost | 156/405 R |

FOREIGN PATENT DOCUMENTS

1198960 12/1959 France ................................. 156/405

*Primary Examiner*—John E. Kittle
*Attorney, Agent, or Firm*—Maky, Renner, Otto & Boisselle

[57] ABSTRACT

This invention relates generally as indicated to a servicer and more particularly to a servicer for supplying tire components to a building drum or shaper for the construction of tires, or more particularly for the construction of tire components such as belt and tread assemblies.

32 Claims, 17 Drawing Figures

_Fig. 7_

_Fig. 8_

SERVICER FOR A TIRE BUILDING DRUM

BACKGROUND OF THE INVENTION

In the construction of belted tires, the belt or breaker components are generally stored in stock rolls between adjacent convolutions of a liner. Such components may be precut and can seldom be stored uniformly centered. Yet such components must be applied to the drum carefully centered to attain the required precision in radial or belted tire construction. Many tire building systems employ complex optical or guidelight systems to obtain the desired centering.

A simplified mechanical guiding system is of course preferable to obtain centering but the nature of tire components such as belts or breakers makes them difficult to handle mechanically and subject to distortion which should be avoided.

In belt servicers, it is common practice to permit the belt to hang freely in a loop or festoon, the extent of which is approximately one revolution of the belt building drum. This permits one revolution of the belt to be applied quickly with the loop or festoon simply being taken up. However, when the belt is provided with metallic wire reinforcement, it is sufficiently heavy that in the loop or festoon it may elongate slightly causing distortion even to the extent of changing the angle of the wire or the width of the belt. Accordingly, wire or other heavily reinforced belts should not be looped or festooned free of the liner but should be supported upon leaving the liner so as to avoid the possiblity of elongation.

Moreover, many prior art servicers are extremely complex and occupy an inordinate amount of space. Such servicers cannot readily be relocated from one location to another in a tire plant.

Examples of prior art servicers may be seen in Enders et al U.S. Pat. No. 3,795,563. Other examples of well known and relatively complex prior art servicers may be seen in the U.S. patents to Mallory No. 2,658,691, Mallory et al Nos. 3,216,879, and 3,230,132, and Cantarutti No. 3,278,360.

SUMMARY OF THE INVENTION

In addition to the centering, space, and transportation problems caused by the general complexity of the tire building art, as in any production operation, it is important that the components of the tire or belt and tread assembly, for example, be available where and when needed to obtain optimum production on the drum, shaper or other related machines. The cost of machinery employed in the tire building process is substantial and anything which can reduce that cost while providing optimum production on related machinery, yet producing tires with precision, is highly desirable.

It is accordingly a principal object of the present invention to provide a servicer which utilizes an automatic, simplified, mechanical guiding system for centering the tire components with respect to the building drum or shaper.

Another principal object is the provision of such guiding system utilizing a relatively constant torque spring motor to apply pressure to the edges of air floating components.

Still another important object is to provide such guiding system which will properly center the components will minimal distortion while being transferred from the servicer to a shaper or drum.

Still another object is the provision of such guiding system wherein automatic width adjustment is available to cover a designed range of components.

Another significant object is the employment of fan-forced air flotation chambers or trays utilized to minimize the component distortion during transfer and to enable the centering guides to function properly. Such air flotation chambers or trays also facilitate the employment of a simplified tail retractor automatically to retract the leading end of the tailing component after application.

Another important object is the provision of such tail retractor which is acutated by a fluid power actuated roller combined with an overrunning antibacklash clutch for the liner roll to obtain retraction in a simplified manner with minimal distortion.

Another object is the provision of a servicer having simplified loading and threading and which incorporates substantially backward stripping to ensure that tacky stock is removed from the liner without undue stretching or distortion.

Still another object is a servicer which will strip the material from the liner and place the material back on the liner for constant speed application.

It is also an important part of the present invention to provide a simplified single hub, brake and clutch drive for the drum or shaper which also drives the servicer through a gear or sprocket changeable drive box in turn driving a sprocket sliding on a square shaft to obtain synchronous drive between the liner and drum surface.

Individual clutches are employed for each liner drive and liner roll so that the operator may readily select the component desired in the tire building operation.

A further object is the provision of a servicer of highly simplified construction utilizing modularized components and parts in a compact manner which facilitates not only loading but also transportation from one location to another in a tire plant.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 1:
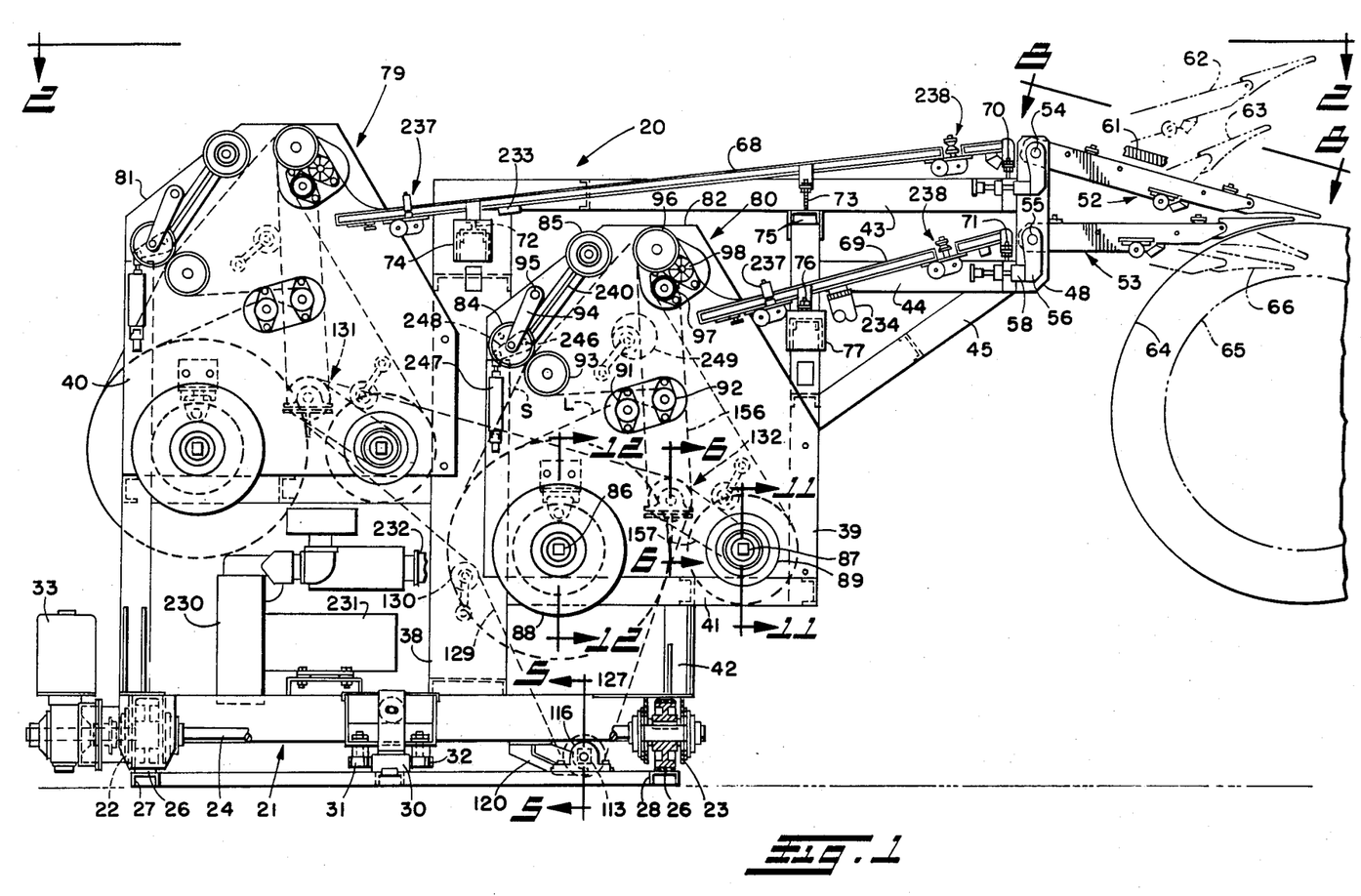
FIG. 1 is a side elevation partially broken away and in section of a servicer in accordance with the present invention.
Figure 2:
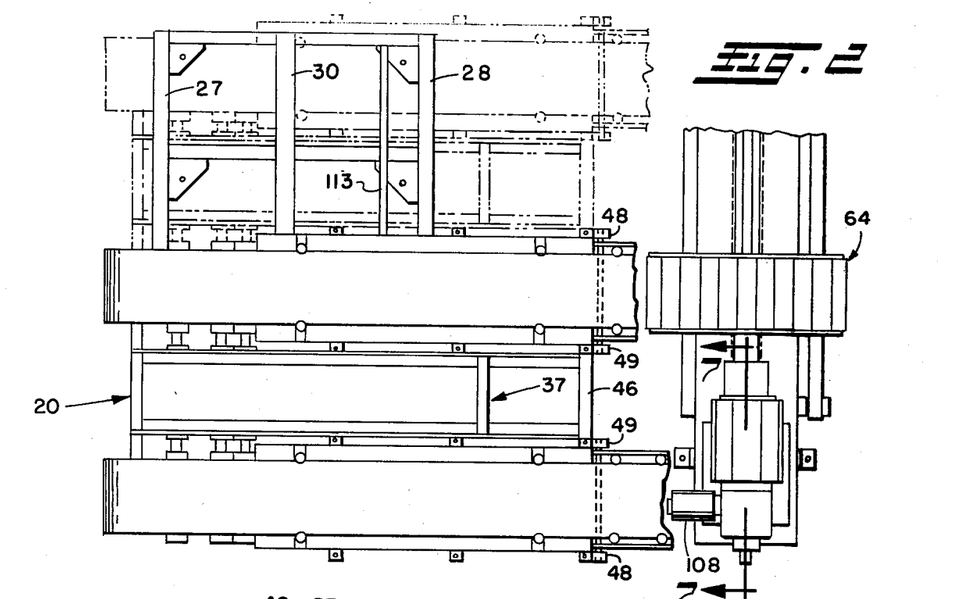
FIG. 2 is a top plan view of the servicer again partially broken away, on a somewhat reduced scale illustrating in phantom lines the alternate or shuttle positions thereof, such top plan view being taken substantially from the line 2—2 of FIG. 1.
Figure 3:
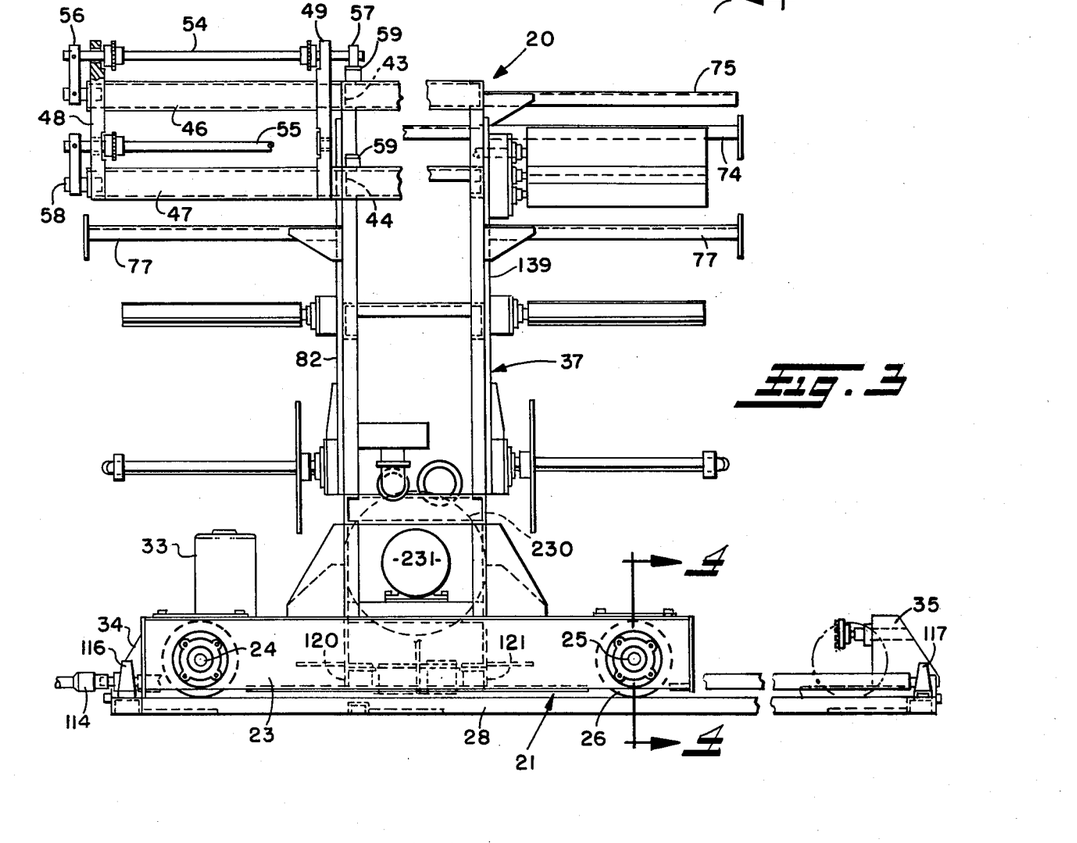
FIG. 3 is a front elevation of the servicer on the same scale as in FIG. 1 with several parts being broken away or removed for clarity of illustration.
Figure 4:
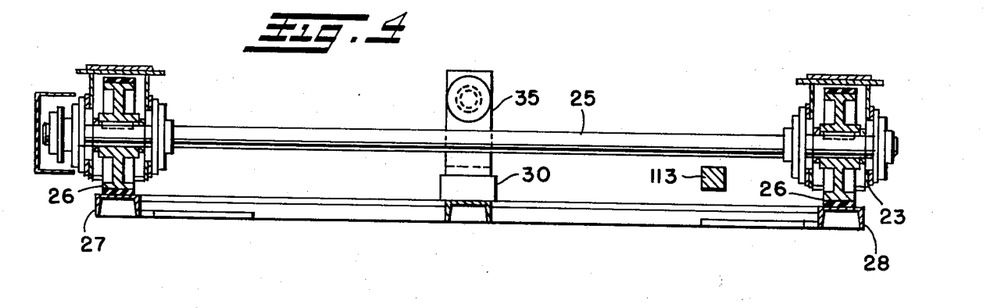
FIG. 4 is a somewhat enlarged vertical section taken from the line 4—4 of FIG. 3 illustrating the roller and rail supports for the servicer.
Figure 5:
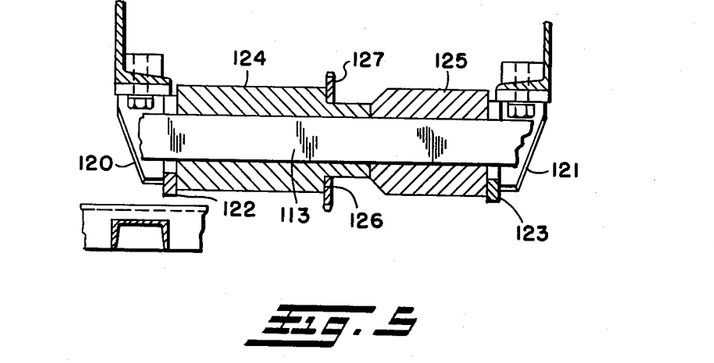
FIG. 5 is a further enlarged fragmentary section taken substantially on the line 5—5 of FIG. 1 illustrating the square shaft and sliding sprocket drive for the servicer.

THE SERVICER GENERAL ARRANGEMENT—FIGS. 1-3

Referring first to FIGS. 1-3 it will be seen that the servicer shown generally at 20 includes a rectangular base frame 21, the front and rear members of which are in the form of box beams seen at 22 and 23 having journalled therebetween axles 24 and 25, each of which supports two wheels 26 as shown, each wheel being within the confines of the box frame and projecting slightly therebelow to support the frame on parallel rails 27 and 28 in turn supported on the floor.

It is noted that neither the wheels nor rails are flanged, longitudinal guiding of the servicer along the rails being obtained by the center rail 30 and the downwardly projecting vertical axis roller 31 and 32 secured to the frame 21 on each side of the rail 30. The servicer is driven along the rails by gear motor 33 driving axle 24. The gear motor may be connected to both axles through a suitable chain drive, if desired. The top of the center or guide rail 30 may be provided with certain limit switch contacts to decelerate and stop the servicer in abutment against adjustment mechanical stops 34 and 35 accurately to position it in two alternate positions as seen more clearly in FIG. 2 by the phantom line and full line positions shown.

The servicer includes an upstanding center frame 37 shown more clearly in FIGS. 2 and 3. The frame may be fabricated primarily of channel members and includes generally central parallel column members 38 and fore and aft parallel column member 39 and 40. While the latter column members extend directly from the base, the former column member 39 extend from horizontal frame 41 projecting in cantilever fashion from the base frame 21 and supported by relatively short column members 42.

Projecting further forwardly are horizontal frame members 43. Relatively shorter horizontal frames 44 project forwardly of the columns 39 and are supported by diagonal braces 45. The frame members 43, 44 and 45 support in the cantilever fashion shown transversely extending frame members 46 and 47, which project laterally from the central frame 37. On each side of the central frame the horizontal frame members 46 and 47 support vertically extending plates seen at 48 and 49, there being two such plates on each side of the central frame 37, all as seen more clearly in FIG. 3.

Such vertically extending plates hingedly support outer or distal component dispensing tray assemblies 52 and 53 as shown at 54 and 55, respectively. Exteriorly of the plates 48 and 49, each hinge shaft has secured thereto a stop arm as seen 56 and 57, the former engaging adjustable stop 58 while the latter engages fixed stop 59. A coil spring 61 for each of the trays urges such trays to their retracted positions seen in phantom lines in FIG. 1 at 62 and 63. In such position the arms 57 will be in engagement with the fixed stops 59. The trays may readily be pulled down to the dispensing position shown in full lines for the drum or shaper 64. For a smaller size drum as indicated at 65, the stops 58 may be adjusted so that the trays achieve the position shown at 66. The distal dispensing trays are shown in detail in FIGS. 8, 9 and 10.

It will be appreciated that such trays project in cantilever fashion to clear other components in the tire building operation such as stitchers and transfers, not shown. Reference may be had to applicant's copending application Ser. No. 886,743, entitled "Modular Tire Building Machine". filed even date herewith, for a disclosure of a tire building machine with which the present invention may be employed.

The transverse frame 46 and 47 also adjustably support the outer ends of fixed trays 68 and 69 on each side of the central frame 37 as seen at 70 and 71, respectively. The upper tray 68 is substantially longer than the lower tray 69 and is also adjustably supported at 72 and 73 from arms 74 and 75 extending laterally from the central frame. Similarly, the shorter tray 69 is also ajustably supported at 76 from laterally projecting arm 77.

The illustrated servicer includes four storage and dispensing units, two on each side of the main frame 37. It will however be appreciated that more than two many be provided on each side. The dispensing units on the same side are identical and the dispensing units on the opposite are mirror images of the corresponding units. The two units on the side of the frame nearer the viewer in FIG. 1 are shown generally at 79 and 80. Each of such units is supported by a single inboard support plate each having the same profile configuration as seen at 81 and 82. The plate 81 is secured to the exterior of columns 40 and 38 while the plate 82 is somewhat lower and is secured to the exterior of columns 38 and 39.

Since the units 79 and 80 are the same, only the unit 80 will be described in detail. All of the rolls or shafts with the exception of pressure roll 84 and tail retractor roll 85 are journaled in and project in cantilever fashion from the plate 82.

Near the lower edge of such plate are two relatively widely spaced square shafts 86 and 87 on which the stock roll 88 and the liner take-up roll 89 are each removably mounted. The stock roll is generally much larger since when it is full it comprises the tire components such as belts or breakers between adjacent convolutions of liner. From the stock roll, the liner L, for difficult to strip materials, passes around two stripping rolls 91 and 92 and then through the nip of knurled rolls 93 and 84, the latter being supported by the arms 94 from shaft 95 projecting from the plate 82. The weight of the roll 84 may provide the nip pressure between the rolls 84 and 93.

The stock S, having been stripped from the liner also moves through the nip of the rolls 84 and 93 and both the stock and the liner move beneath the tail retractor roll 85 and over the top of liner drive roll 96. The pressure of roll 84 is not sufficient to cause even tacky stock to readhere to the liner and is employed simply for tracking. From the liner drive roll the liner passes around roll 97 and then to liner take-up roll 89. The roll 97 ensures that the liner will wrap around the major extent of the surface of the liner drive roll 96 whichis also knurled. A beater such as a brush or like device shown at 98, also driven from the drive roll in the same direction, ensures that the stock passes on to the adjacent tray 69. As hereinafter described in connection with the threading diagrams, FIGS. 14–17, such threading may vary for tacky or less tacky stocks and for the units on the opposite side of the servicer.

SERVICER DRIVE—FIGS. 1,2,7 and 13

In the illustrated embodiment, the servicer is employed with a belt and tread assembly building drum. It will, however, be appreciated that the servicer may equally well be employed with a second stage shaping machine or a wide variety of other types of tire building machines.

Figure 7:
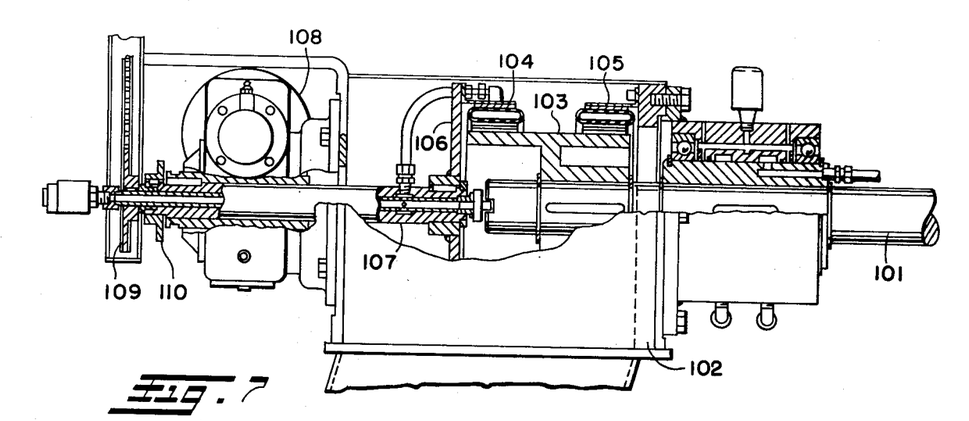
FIG. 7 is an enlarged fragmentary view of the drum and servicer drive as taken from the line 7—7 of FIG. 2 partially broken away and in section.
Figure 13:
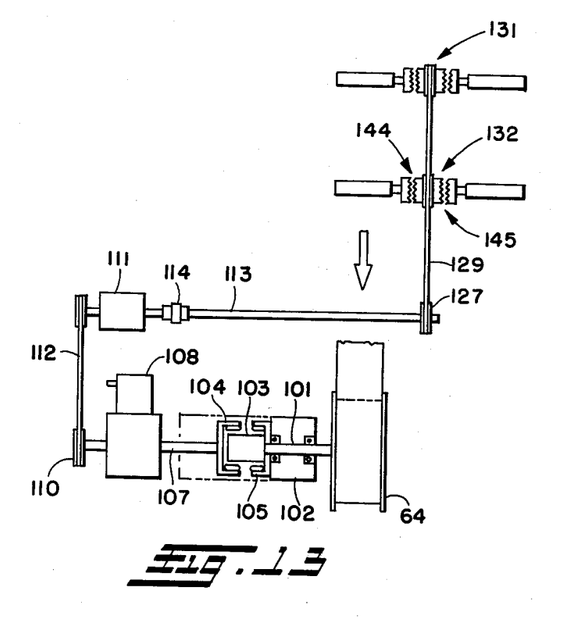
FIG. 13 is a schematic illustration of the drum or shaper, and the drive therefor which also drives the various stock roll components of the servicer.

In a belt building drum, the drum is expanded to form the belt and after the belt and tread assembly is formed, it may be transferred to a haping machine for final assembly with a green tire carcass. As seen in FIGS. 7 and 13 the drum is mounted on shaft 100 and is journaled in rotary seal 101 secured to housing 102. As illustrated, the seals and journals are on a sleeve keyed to the main shaft for ease of maintenance. The shaft includes an axially extending hub 103 keyed thereto which cooperates with an air clutch 104 and an air brake 105. The air clutch 104 is mounted on disc plate 106 which is secured to shaft 107. The shaft 107 is driven by drive gear motor 108 and rotates continuously. As seen in FIG. 7, the shaft 107 is provided with two sprockets 109 and 110, the former driving a one revolution device or suitable control, while the latter drives quick change gear or sprocket drive box 111 through chain drive 112. The transmission drives square shaft 113 through flexible coupling 114.

As seen more clearly in FIGS. 1, 2 and 3, square shaft 113 extends parallel to the rails 27 and 28 and is journaled for rotation in the pillow blocks seen at 116 and 117.

Secured to the underside of the frame 21 are two drive brackets 120 and 121 which include thrust plates 122 and 123, respectively, between which are confined spacers 124 and 125, each having square through-holes therein sliding on the shaft 113. The spacer 124 is provided with a circular shoulder 126, to the face of which is secured drive sprocket 127. The sliding drive sprocket is supported between the drive brackets in the manner indicated to be centrally positioned beneath the center frame 37. From the sliding drive sprocket 127 drive chain 129 extends about chain tensioner 130 and then about drive clutch assembly 131 and drive clutch assembly 132, the latter being shown in detail in FIG. 6.

Figure 6:
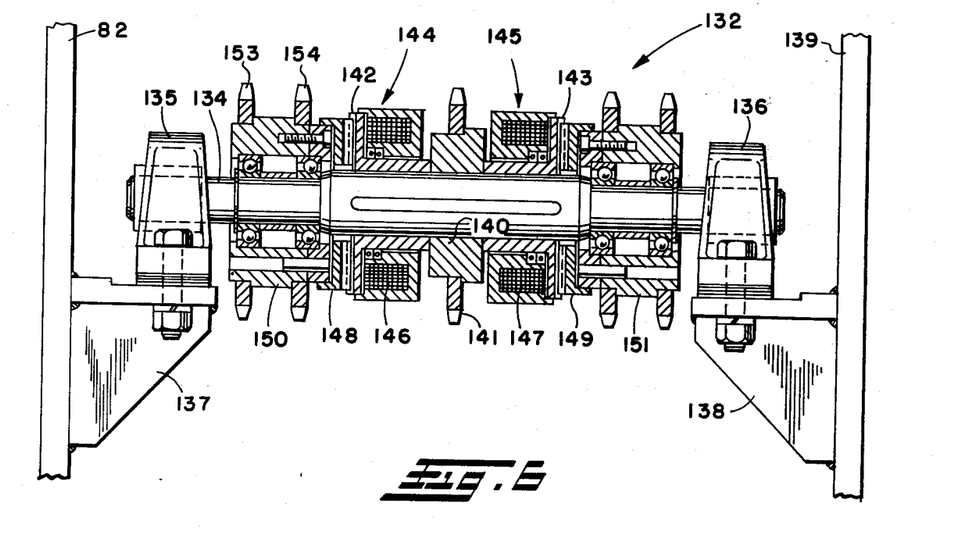
FIG. 6 is a further enlarged fragmentary vertical section illustrating the selective clutch drive for the servicer units taken substantially on the line 6—6 of FIG. 1.

Referring now to FIG. 6 it will be seen that that the clutch assembly is mounted on shaft 134 journaled in pillow blocks 135 and 136 shim mounted on brackets 137 and 138 extending from the unit mounting plate 82 and the opposite unit mounting plate 139. Keyed to the shaft is hub 140 for sprocket 141 driven by the chain drive 129. Also secured to the shaft by the elongated key illustrated are the tooth elements 142 and 143 of the electromagnetic tooth-type clutches shown generally at 144 and 145 on each side of the central drive sprocket 141. The electromagnetic fields indicated at 146 and 147 draw the toothed adaptors 148 and 149 into engagement with the clutch toothed elements 142 and 143, when energized. Such adaptors are mounted for limited sliding movement on hubs 150 and 151, each journaled on the shaft 134. When the respective clutch is engaged, the drive sprocket 141 will thus drive the respective hub which in turn rotates two sprockets seen at 153 and 154 for the hub 150. One of such paired sprockets drives chain 156 driving the liner drive roll 96 while the other drives chain 157 driving the sprocket 158 to rotate the shaft 87 of the liner take-up roll 89.

It can thus be seen that the servicer is driven from the drive of the tire or belt building drum, or vice-versa, and the shaft 113, chain 129 and the shafts of the clutch assemblies 131 and 132 rotate continuously. The operator selects the unit from which the components are to be dispensed by selectively engaging the four electromagnetic clutches, one for each unit of the servicer. The gearing of the transmission 111 is selected so that the peripheral velocity of the drum in its expanded condition is the same as the peripheral velocity of the liner drive roll 96 when rotating. If a different set diameter of the drum is employed, the gearing of the transmission may be changed to obtain the desired identical surface speeds.

DISTAL DISPENSING TRAY AND MECHANICAL CENTERING

Figure 8:
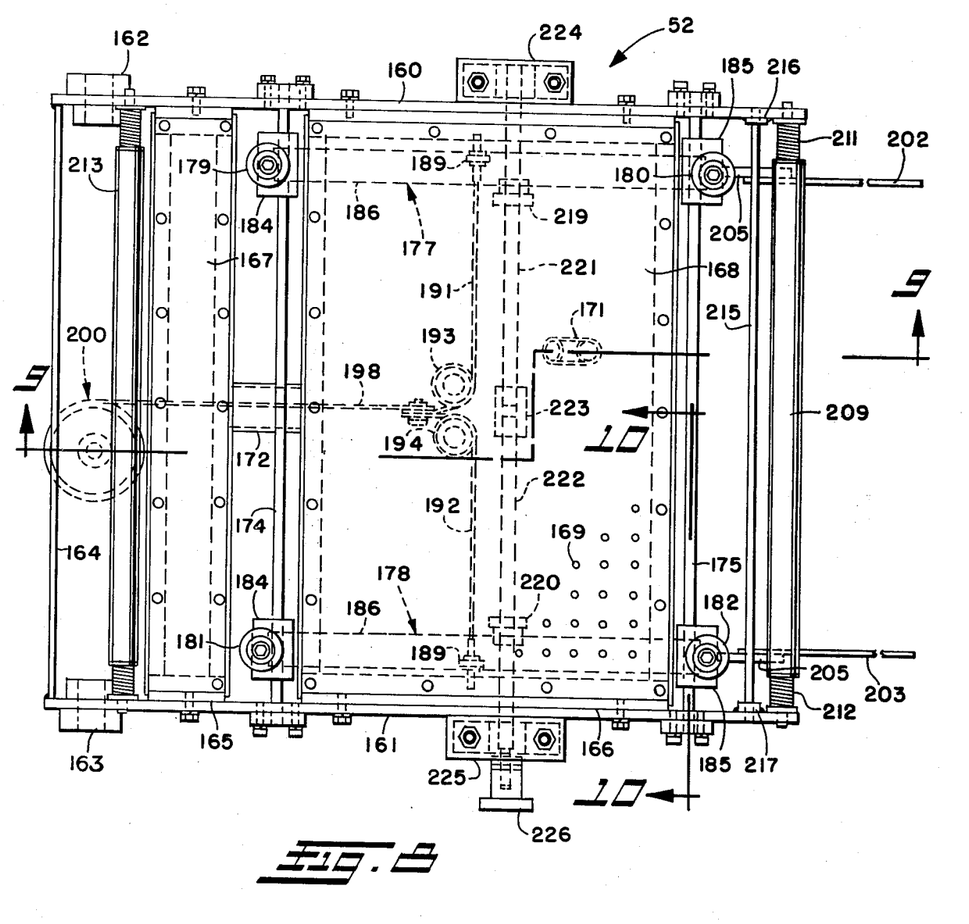
FIG. 8 is an enlarged top plan view of one of the distal air flotation trays illustrating the automatic centering guide employed with the present invention as seen from the line 8—8 of FIG. 1.
Figures 9, 10, 11, 12:
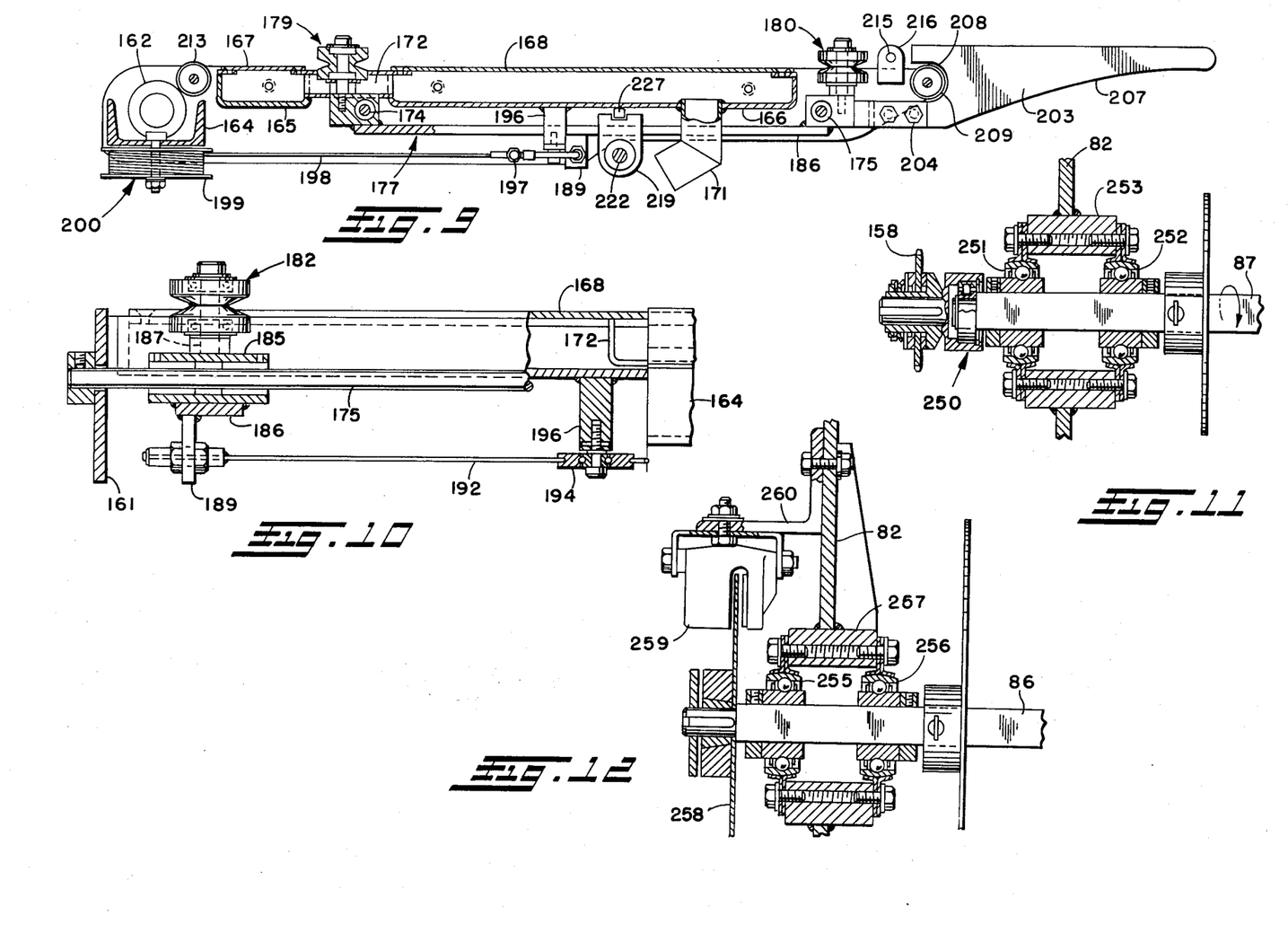
FIG. 9 is a vertical section taken substantially on the line 9—9 of FIG. 8.
FIG. 10 is a fragmentary vertical section taken substantially on the line 10—10 of FIG. 8.
FIG. 11 is an enlarged fragmentary vertical section taken substantially on the line 11—11 of FIG. 1 illustrating the overrunning anti-backlash drive for the liner take-up roll.
FIG. 12 is a similar vertical section illustrating the support and disc drag brake employed in connection with the stock roll as seen from the line 12—12 of FIG. 1.

Referring now to FIGS. 8–10 it will be seen that the outer or distal dispensing tray 52 includes two side plates 160 and 161 which at their proximal ends include hubs shown at 162 at 163 accommodating the hinge shaft 54. Such side plates are also interconnected at the proximal end by channel shape frame element 164.

Also interconnecting the side plates are chambers 165 and 166, each of which includes removable top plates as seen at 167 and 168, respectively. Such plates ae coplanar and each plate includes a reticulate arrangement of relatively small perforations as seen more clearly in FIG. 8 at 169. The relatively larger chamber 166 is provided with an air inlet fixture 171 and such chambers are interconnected by the passage shown at 172.

Also secured to and extending between the two side plates are parallel guide rods 174 and 175, the former extending between the plates in the space between the two chambers while the latter extends between the plates immediately in front of the larger chamber 166. Two carriages shown generally at 177 and 178 are supported on such guide rods for sliding movement toward and away from each other. Each carriage supports relatively widely spaced V-notch guide rolls as seen at 179 and 180 for the carriage 177, and 181 and 182 for the carriage 178. Since each carriage is identical, common reference numerals will be employed.

Each carriage includes an axially elongated block seen at 184 and 185 journaled as by ball bushings for sliding movement on the respective guide rods 174 and 175. Such guide blocks are interconnected by horizontal plates 186. Each guide block supports a vertically extending shaft 187 on which the V-notch rollers are journaled as seen more clearly in FIG. 10. The root of the V of each V-notch is slightly above the top plates 167 and 168 of the chambers 165 and 166. Each horizontal plate 186 includes a depending adjustment screw bracket 189 secured thereto. To each such bracket is adjustably secured the end of a wire or cable as seen at 191 and 192. Each such cable extends around vertical axis sheaves 193 and 194, respectively. Such sheaves are each journaled on the underside of depending projections 196 secured to the underside of chamber 166. Such cables are of equal length and joined at 197 to single cable 198 wound on the spool 199 of linear spring motor 200 secured to the underside of the transverse channel frame member 164 as shown. The cable 198 is positioned in alignment with the centerline of the tray such that the force of the relatively constant torque spring motor 200 will be evenly distributed to the cables 191 and 192 urging the same toward the center of the tray. The guide rolls on opposite sides of the centerline are always uniformly spaced therefrom. The spool or reel on which the cable 198 is wound is powered by a substantially constant torque spring motor such as sold under the trademarks NEG'ATOR or SPIR'ATOR by the Hunter Spring Division of Ametek Inc. Spring motors of the type which may be employed may be seen, for example, in U.S. Pat. Nos. 2,833,027 and 2,833,534.

Such motors exhibit a substantially constant force over a rather wide range of extension and have been found very suitable for edge guiding of the tire components to obtain precise centering with respect to the dispensing tray.

As seen more clearly in FIGS. 8 and 9, each carriage also includes a forwardly projecting side guide seen at 202 and 203, each secured by the fasteners 204 to forwardly extending projections 205 extending from the blocks 185 supporting the guide rollers 180 and 182. As seen more clearly in FIG. 9, the underside of the extensions is provided with the arcuate profile seen at 207 so that the tray may be positioned adjacent the surface of the drum on which the material is to be dispensed. Also as seen in FIG. 9, the side guides are provided with a U-shape cut-out 208 accommodating idler roll 209 which is supported between the side plates 160 and 161 between compression springs seen at 211 and 212 which centers such roller 209. A similarly supported roll 213 is provided at the proximal end of the tray. At the distal end of the tray slightly above the roller 209 is provided a transverse guide rod 215 supported by brackets 216 and 217 beneath which the component must pass. This ensures that the component will maintain its proper engagement with the side guide rollers even as the operator places the same on the drum for winding thereon.

In order to minimize excess travel of the side guides, adjustable mechanical stops are provided as indicated at 219 and 220 in FIG. 8. Such stops are threaded on opposite hand screws 221 and 222 interconnected at 223 in the center of the tray. Such screws ae journaled in blocks 224 and 225 secured to the outside of the side plates 160 and 161 respectively, and may be rotated by the thumb knob 226. As seen more clearly in FIG. 9, the stops include an upstanding portion, the top edge of which is provided with a notch guided by the rib 227 secured to the underside of the chamber 166. Such stops engage the horizontal bars 186 of the carriages 177 and 178 minimizing excess travel.

When dispensing belt or breaker assemblies for the construction of belt and tread assemblies, it will be seen that the device will accommodate components ranging from approximately four inches mininum width to approximately sixteen inches maximum width and for each and those in between, accurate centering may be obtained.

AIR FLOTATION

As indicated, both of the outer or distal tray assemblies 52 and 53 are provided with air flotation. So also are the inner tray assemblies 68 and 69. Each includes a top surface or plate provided with a plurality of relatively small rectangular arranged openings, such top surface covering a plenum chamber. Air pressure is supplied to the plenum chamber by a blower 230 driven by blower motor 231 supplying air pressure through flexible hoses 232 which are connected to fittings 233 and 234 for the upper and lower fixed tray assemblies 68 and 69, respectively. Such hoses are also connected to the fittings 171 of the outer tray assemblies 52 and 53 also to provide pressure to the plenums for air flotation. Similar hoses are connected from the hose fitting 232 to the dispensing units and the trays fixed and pivotal on the opposite side of the servicer.

Each of the fixed tray assemblies 68 and 69 is provided with manually adjustable side guide roller assemblies as seen at 237 and 238, the former employing relatively high cylindrical side guide rolls while the latter employs somewhat shorter V-groove rolls.

In any event the stock as soon as it is deposited by the beater 98 onto the respective tray assembly 68 or 69 is air floated through the manually adjustable guide rolls onto the outer tray assemblies 52 and 53 wherein the constant torque linear spring motor mechanically brings the stock to the assured center of the servicer dispensing trays.

TAIL RETRACTOR

Referring now to FIGS. 1, 11 and 12 it will be seen that the stock may be retracted by actuating tail retractor roll 85, there being one for each unit. The tail retracting roll is mounted on a swinging arm 240 which is pivoted at 246 to the plate 82. A piston-cylinder assembly 247 is pivoted to arm 248 to swing the arm 240 to move the tail retractor roll 85 to the phantom line position seen at 249.

Tail retraction will normally occur after the operator has applied a component to the drum or has completed the construction of the belt and tread assembly, for example. In this condition, the outer tray assemblies then swing to the clear position seen at 62 and 63 and the tail is then retracted by moving the roll 85 to the phantom line position 249. The drive clutches are then of course disengaged. Movement of the tail retractor roll 85 to the position 249 as indicated will cause the leading edge of the tail of the component to retract as well as causing the liner also to retract. Since the clutch is disengaged, the liner drive roll 96 will simply move in the opposite or counterclockwise direction causing the liner take-up roll to move also in the counterclockwise direction, as seen in FIG. 1.

This is permitted by the overrunning anti-backlash clutch seen more clearly at 250 in FIG. 11. The shaft 87 of the liner take-up roll is normally driven in a clockwise direction as viewed in FIG. 1 through the sprocket 87, such shaft being journaled at 251 and 252 within the hub 253 secured to the plate 82. With the drive to the sprocket 158 disengaged, movement of the tail retractor roll 85 to the phantom line position 289 will reversely rotate the liner drive roll 96 and also, because of the overrunning and anti-backlash clutch 250, reversely rotate the liner take-up roll 89. The extent of tail retraction can of course be controlled by the extent of movement of the piston cylinder assembly 247.

The stock roll is unaffected by such movement because of its mounting as seen in FIG. 12. The shaft 86 of the stock roll is journaled at 255 and 256 within hub 257 secured to the mounting plate 82. Such shaft is not driven but rather is provided with a brake disc 258 which moves within brake element 259 secured to bracket 260, in turn securing to the plate 82. The brake, as illustrated, acts as a drag, permitting yet precluding excessive rotation of the stock roll, in either direction. As soon as the tail retractor roll is returned to its position shown in FIG. 1 in full lines, the stock may be paid from the unit in the conventional manner by energization of the clutch assembly seen in FIG. 6. The liner roll is, of course, provided with mechanical drag brakes for rolling up and to prevent overspin when tail retracting.

THREADING

Figure 14:
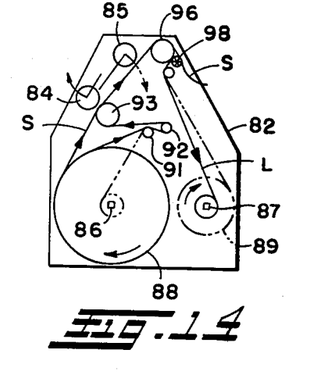
FIG. 14 is a schematic threading diagram for tacky stocks.

Referring now to schematic FIGS. 14–17, it will be seen that the stock in FIG. 14 may be threaded in the manner indicated for tacky stocks. The stock roll 88 is positioned on its shaft 86 and the liner is threaded about the stripping rolls 91 and 92 with the liner and the stipped stock S moving between the nip of the rolls 84 and 93. In this manner should the stock S tend to adhere to the liner L, it will be pulled therefrom at approximately 180° as dictated by the periphery of the roll 91 and the roll 93. The stock and liner move through the nip of the rolls 84 and 93 over the liner drive roll 86 with the stock being moved onto the flotation trays by the beater 98 while the liner is then rewound on the liner take-up roll 89 on the shaft 87.

Figure 15:
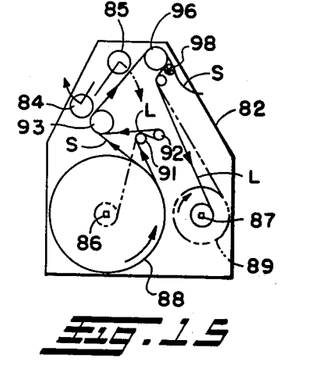
FIG. 15 is a threading diagram for tacky stocks with the stock roll reversed.

Referring now to FIG. 15, there is illustrated the threading diagram for tacky stocks with the stock roll reversed. Such unit represents the side of the servicer opposite the units seen in FIG. 1. In such position the stock roll is positioned on the shaft 86 and the stock again moves through the nip of the rolls 84 and 93 with the liner moving through the stripping rolls 91 and 92. Again the positon of the roll 91 with respect to the roll 93 requires that the stock be stripped from the liner at substantially 180°. The liner and stock then move through the rolls 84 and 93 and around the liner drive roll 96 with the stock being dispensed by the beater 98 onto the air flotation trays while the liner L is taken up by the liner take-up 89 on shaft 87.

The action obtained by the stripping rolls is similar to pulling adhesive tape from skin. It can be done more effectively with less force and distortion if pulled back upon itself at about 180° from its original direction.

Figure 16:
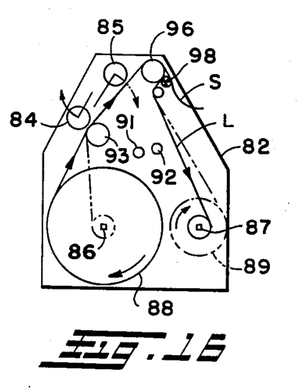
FIG. 16 is a threading diagram for less tacky stocks.
Figure 17:
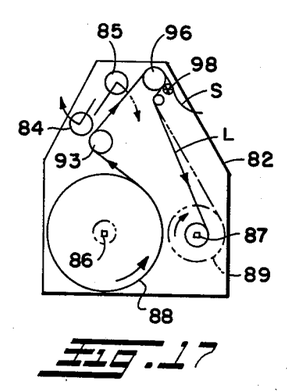
FIG. 17 is a threading diagram for less tacky stocks with the stock roll reversed.

For less tacky stocks, the stripping rolls 91 and 92 need not be employed. In FIG. 16 there is illustrated a threading diagram essentially the same as FIG. 14 but the stock from the stock roll 86 passes directly through the nip of the rolls 84 and 93 with the liner. The stock and liner then pass about the liner drive roll 96 with the beater dispensing the stock S onto the air flotation trays while the liner L is then wrapped around the liner take-up roll 89 mounted on the shaft 87. For the opposite unit as seen in FIG. 17, the stock roll rotates of course in the opposite direction but again the stock and liner pass both through the nip of the rolls 84 and 93 and about the liner drive roll 96 with the stock passing onto the air flotation trays while the liner L is taken up by the stock take-up roll 89 mounted on the stock take-up roll shaft 87.

It can now be seen that there is provided a tire component building servicer for the construction of tires or tire components such as belt and tread assemblies, such servicer being of the shuttle type and being driven from a building drum or shaper drive. The servicer includes a reciprocating carriage and four or more supply rolls, two of which may be aligned with the shaper or drum in two alternate positions of the carriage. Each roll includes at least one adjustable and retractable air flotation dispensing tray which includes an automatic, mechanical guiding system utilizing a relatively constant torque spring motor to apply a substantially uniform centering edge pressure to the air floating component to ensure close tolerance centering with minimal component distortion during transfer. A simplified tail retractor utilizes a fluid power actuated roller which combined with an overrunning anti-backlash clutch for the liner roll and air flotation of the component minimizes distortion.

Threading of the servicer is simplified and substantially 180° stripping is employed to remove tacky stock from the liner to avoid stock stretching and distortion. A simplified single hub, two brake drive for the drum also drives the servicer through a gear changeable gear box in turn driving a sprocket sliding on a square shaft to obtain synchronous drive with individual clutches for each liner drive and liner roll employed for selectively. The servicer is constructed of modularized components in a compact manner to facilitate loading and transportation from one location within a plant to another.

Other modes of applying the principal of the invention may be employed, change being made as regards the details described, provided the features stated in any of the following claims or the equivalent of such be employed.

The embodiments of the invention in which an exclusive property or privilege is claimed are defined as follows:

1. A tire component servicer including means to convey the component to an air flotation tray, centering guide means on said air flotation tray, said guide means comprising component edge contacting means, and substantially constant force spring motor means urging said edge contacting means uniformly symmetrically toward the center line of said tray.

2. A servicer as set forth in claim 1 wherein said centering guide means comprises transverse guide rods, two carriages journaled on said guide rods for movement toward and away from each other, and edge guide rolls on each carriage.

3. A servicer as set forth in claim 2 including a cable adjustably connected to each carriage, a sheave for each cable changing the direction thereof, said motor means being connected to each cable to pull said carriages toward with each other with a substantially constant force.

4. A servicer as set forth in claim 3 wherein said sheaves are substantially adjacent each other said cables being joined to a single cable after they pass about said sheaves, said single cable being connected to said spring motor means.

5. A servicer as set forth in claim 4 wherein said single cable is coextensive with the centerline of said tray substantially normal to each cable from the carriage to its respective sheave.

6. A servicer as set forth in claim 5 including adjustable symmetrical stop means limiting the movement of said carriages toward each other.

7. A servicer as set forth in claim 2 wherein each carriage includes a side guide projecting from the discharge end of the tray.

8. A servicer as set forth in claim 2 including a plenum chamber having a perforate top surface to float the component thereon as it passes between said edge guide rolls.

9. A servicer as set forth in claim 7 including two plenum chambers, one of the edge guide rolls in each carriage moving between said plenum chambers.

10. A shuttle servicer comprising a carriage mounted on rails for movement between alternate positions a central frame on said carriage, aligned dispensing units projecting in cantilever fashion from each side of said central frame, the units on one side of said frame being aligned with a tire building machine in one of said alternate positions, while the units on the other side of said frame are aligned with said machine in the other alternate position, a square shaft extending parallel to said rails and journaled for rotation, and means selectively to drive said units from said shaft in any position of said carriage along said rails.

11. A servicer as set forth in claim 10 including an endless drive in said central frame, said drive including a sprocket sliding on said square shaft.

12. A servicer as set forth in claim 11 wherein said endless drive includes a clutch shaft, said shaft including two clutches, one for each unit on opposite sides of said frame.

13. A servicer as set forth in claim 12 wherein said servicer includes four units, two on each side of said central frame, said endless drive including two parallel clutch shafts.

14. A servicer as set forth in claim 13 wherein each unit includes a stock roll, a liner drive roll, and a liner take-up roll, each clutch driving a dual sprocket, one driving the liner drive roll and the other driving the liner take-up roll.

15. A servicer as set forth in claim 14 including an overrunning clutch for said liner take-up roll permitting said roll to move freely in a reverse direction when the clutch for said unit is disengaged.

16. A servicer as set forth in claim 15 including a disc-type drag brake for the stock roll, and a movable tail retractor between said stock roll and liner drive roll operative reversely to rotate said liner drive roll and pull the liner from the liner take-up roll when the clutch for said unit is disengaged.

17. A servicer as set forth in claim 16 wherein said tail retractor comprises a roll mounted on a swing arm to increase the path of the liner and stock between the stock roll and liner drive roll.

18. A tire component servicer comprising a stock roll, a liner take-up roll and a liner drive roll, the liner drive roll and liner take-up roll being driven, the latter through an overrunning clutch, a tail retractor positioned upstream of the liner drive roll and downstream of the stock roll operative to increase the path of the liner and stock to retract the stock and liner.

19. A servicer as set forth in claim 18 wherein said tail retractor comprises a roll mounted on a swing arm for such movement.

20. A servicer as set forth in claim 18 including air flotation trays supporting the stock downstream of said liner drive roll.

21. A servicer as set forth in claim 20 including two air flotation trays aligned with each other, the one removed from said liner drive roll being hinged for movement to and from an operative dispensing position.

22. A multi-unit servicer-tire building machine combination comprising a drive motor, a drive shaft driven by said drive motor, drive means including a gear changeable transmission interconnecting said shaft and servicer, said servicer including a common drive for all units, clutch means for each unit operative to drive a selected unit from said common drive, said tire building machine comprising a drum, cooperating clutch and brake means operative to rotate said drum a predetermined extent as the clutch of the selected unit is energized, the peripheral speed of the drum and the selected unit being synchronized by said gear changeable transmission, said transmission driving a square shaft along which said servicer moves, and a sliding sprocket on said shaft driving said common drive.

23. A combination as set forth in claim 22 wherein said tire building machine comprises a drum, a drive shaft for said drum coaxial with said drive shaft, a hub on said drive shaft, and clutch means interconnecting said drum and drive shaft to rotate said drum.

24. A combination as set forth in claim 23 including a brake on said hub operative to restrain rotation of said hub and thus said drum when said clutch is disengaged.

25. A tire component servicer comprising a dispensing tray assembly including a pair of longitudinally spaced, flat, coplanar support means for the component, means to convey the tire component to said tray, centering guide means on said tray including a transverse guide rod, two carriages journaled on said guide rod for movement toward and away from each other, edge guide rolls on each carriage and movable transversely with each carriage intermediately said spaced support means, and means for urging said carriages uniformly symmetrically toward the center line of said tray.

26. The servicer as set forth in claim 25 wherein each support means comprises an air flotation tray.

27. A servicer as set forth in claim 26 wherein the air flotation trays ae pneumatically interconnected.

28. A tire component servicer comprising means to convey the component to a dispensing tray, centering guide means for the component on said dispensing tray, said guide means comprising transverse guide rods, two carriages journalled on said guide rods for movement toward and away from each other, edges guide rolls on each carriage, a cable adjustably connected to each carriage, a sheave for each cable changing the direction thereof, and force means connected to each cable operative to pull said carriages toward each other.

29. A servicer as set forth in claim 28 wherein said sheaves are substantially adjacent each other and said cables are joined to a single cable after they pass about said sheaves, said single cable being connected to said force means.

30. A servicer as set forth in claim 29 wherein said single cable is coextensive with the centerline of said tray and substantially normal to each cable from the carriage to its respective sheave.

31. A servicer as set forth in claim 30 including adjustable symmetrical stop means limiting the movement of said carriages toward each other.

32. A servicer as set forth in claim 29 wherein said force means is a substantially constant force spring.

* * * * *